(No Model.)

2 Sheets—Sheet 1.

G. FRISBEE.
MILL FOR CRUSHING OR GRINDING QUARTZ.

No. 378,879.　　　　　　　　　Patented Mar. 6, 1888.

Witnesses.　　　　　　　　　Inventor.

(No Model.)
G. FRISBEE.
MILL FOR CRUSHING OR GRINDING QUARTZ.
No. 378,879. Patented Mar. 6, 1888.
2 Sheets—Sheet 2.
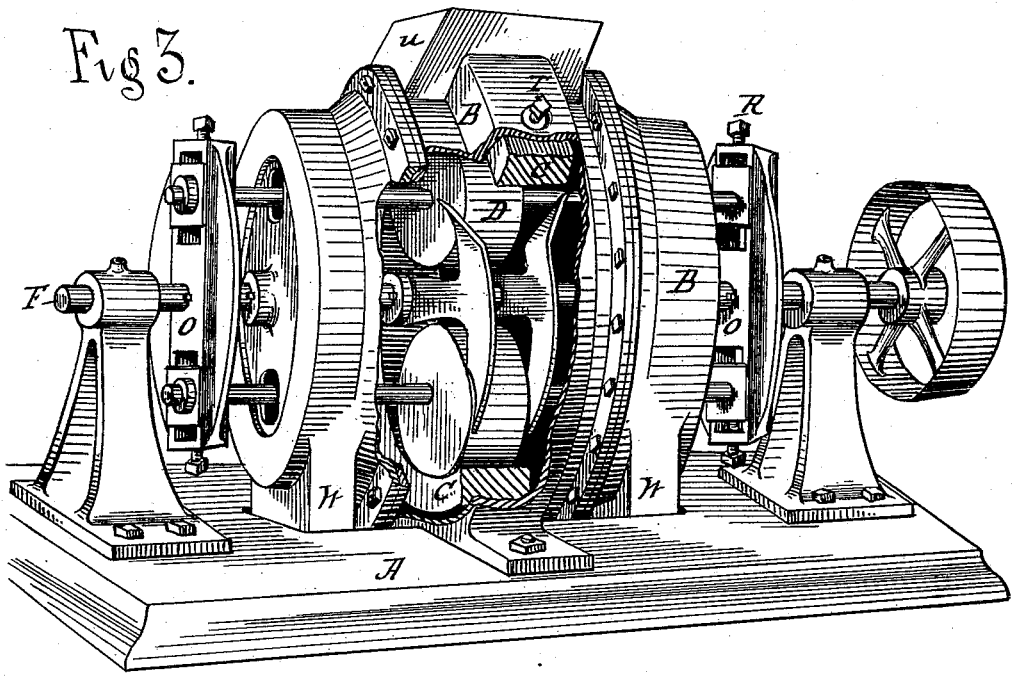
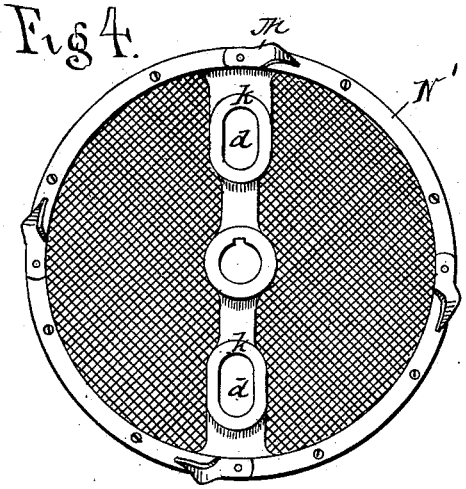
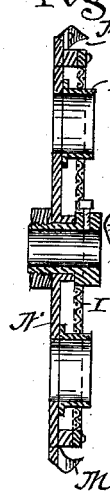
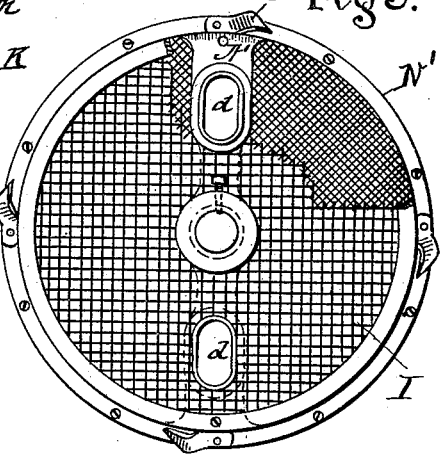
Witnesses.
H. Monteverde
Willis G. Dodd.
Inventor.
Gideon Frisbee

UNITED STATES PATENT OFFICE.

GIDEON FRISBEE, OF NEW YORK, N. Y.

MILL FOR CRUSHING OR GRINDING QUARTZ.

SPECIFICATION forming part of Letters Patent No. 378,879, dated March 6, 1888.

Application filed January 17, 1887. Serial No. 224,645. (No model.)

*To all whom it may concern:*

Be it known that I, GIDEON FRISBEE, a citizen of the United States, residing in the city, county, and State of New York, have invented certain new and useful Improvements in Mills for Crushing or Grinding Quartz and Similar Materials, of which the following is a description in such full, clear, concise, and exact terms as will enable any one skilled in the art to which my invention belongs to make and use the same, reference being had to the accompanying drawings, making part of this specification, and to the letters and figures of reference marked thereon.

Similar letters of reference indicate corresponding parts in all the figures of the drawings.

Figure 1:
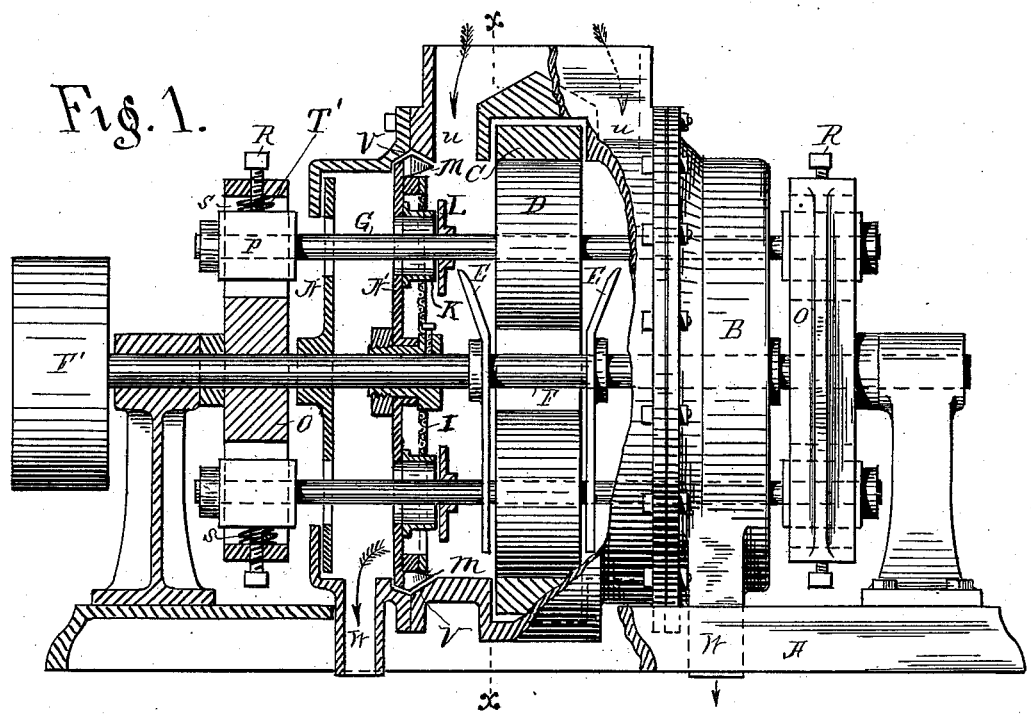
Figure 2:
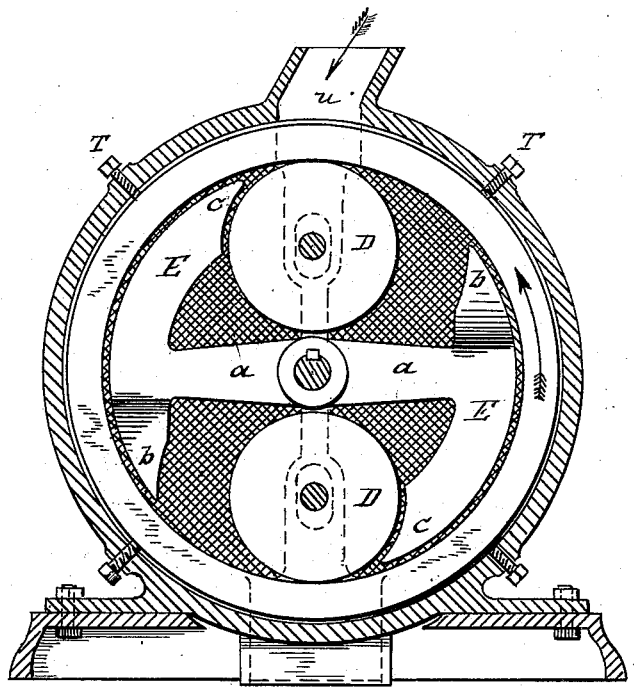

Figure 1 illustrates a vertical longitudinal section of my improved mill, parts of the casing on one side of the mill being retained. Fig. 2 illustrates a transverse vertical section through the mill on the line $xx$, Fig. 1. Fig. 3 shows the mill in perspective, parts being broken away; and Figs. 4, 5, and 6, detail parts thereof.

Referring to Fig. 1, F is the main driving-shaft of the mill, connected with a suitable source of power through the pulley F'. Keyed to this shaft are a pair of arms, O O, one in each side of the machinery. The shafts G G carry the pulverizing-rollers D D. These shafts G, at each end, are carried in journal-boxes P P, which sit in the slots S S in the arms O, which permit said journal-boxes to have a longitudinal motion in said slots, allowing them to approach and retreat from the central shaft, F.

R R are set-screws, which limit the amount of the longitudinal movement of said journal-boxes in said slots. Between said journal-boxes and the outer ends of the slots S are springs T', which retard the approach of said journal-boxes toward the set-screws R, and thus decrease the pressure of the pulverizing-rollers on the pulverizing-ring, as will be hereinafter more fully described.

B is the casing of the mill, inclosing the grinding-ring, rollers, sieves, and other operating parts of the mill. This casing and the grinding-ring C are stationary and are both attached to the bed-plate A. At each end of the casing B is a disk, N, keyed to the shaft F and forming a head-piece for said casing. Through slots in these head-pieces the roller-shafts G G pass. Keyed to said shaft F inside of said head-pieces is a frame, N', carrying a suitable sieve. This frame is also slotted to permit the shafts G to pass through it and not to interfere with their longitudinal motion in the slots on the arms O. Attached to the shaft G is a disk, L, which covers the slot in the frame N' and prevents the egress of the semi-pulverized material through said slots before it is ready to be discharged from the mill. Attached to the main shaft F are the distributing-fans E E, having flanges $b$ and $c$, which catch the ore or other material as it enters the mill through the hopper $u$ and throw it into the path of the revolving pulverizing-rollers against the pulverizing-ring. Arranged at suitable intervals along the edge of the sieve-frames N' are fans M, working in grooves V in the casing, to catch the ore which by centrifugal action has been thrown in their path, casting it back to be further reduced between the pulverizing ring and rollers and preventing leakage at that point. The form of sieves which I prefer to employ is further illustrated in Figs. 4, 5, and 6.

I, Figs. 5 and 6, is a coarse sieve of strong wire placed inside of the finer sieve to protect it from injury. This coarser screen is supported on a frame, preferably smaller than the frame of the finer sieve, and is set a distance in front of it. Any material which passes through the larger sieve, but is not able to pass through the meshes of the outside sieve, is thrown by centrifugal force into the path of the fans M, by which said material is cast back into the mill and further pulverized. A thimble, K, attached to the frame N', is made long enough to extend through the coarser sieve, and the disk L, attached to the shaft G, is set immediately in front of the end of said thimble. Similar disks may be fixed to the shafts G G in front of the slotted disk N, said cylindrical disks in each case operating to throw the pulp away from the slotted openings by centrifugal force and preventing leakage at that point. These disks L may be set a short distance in front of the slots in the frame N', and yet be entirely efficient for the purpose stated, since the material will not pass between them without coming in contact with the revolving parts, and will be by centrifugal action thrown off and cast back into the mill. The ore when sufficiently pulverized passes through the sieves into the chamber between the outer sieve and the disk N, and finally passes out of the mill through the passage W.

T are set-screws by means of which the ring C is held in place and is adjusted.

The operation of my improved machine is the following: Power is applied to the pulley F', and the arms O O, slotted disks N N, slotted sieves, and the crushing-rollers D, all attached to the central shaft F, are caused to revolve. By centrifugal force the journal-boxes P, carrying the shafts G G, are thrown outward until they are stopped by the set-screws R or are cushioned against the springs T', the force of the springs overcoming the centrifugal force of the journal-boxes. Ore or other material to be crushed is fed into the hopper at the top of the machine, and descending is caught by the fans E, which throw it into the path of the rollers, while the guide-flanges c form a channel and confine the rock to the face of the ring until the rollers reach it. The action of said fans also causes a strong draft of air into the casing through the hopper and out through the sieves and discharge-passages, carrying with it the material which has been pulverized to a sufficient degree to enable it to pass through the meshes of the outer and finer sieve.

By means of the set-screws R the rollers can be prevented from coming in close contact with the pulverizing-ring, if desired, for granulation of ores. By means of the spring T' the centrifugal force of the rollers on the pulverizing-ring can be diminished, if necessary, in reducing soft materials. By means of the slots in the arms O the rollers have a free movement away from the ring and toward the central shaft to permit their passage over hard substances that they have not sufficient force to crush at once.

In a mill such as hereinbefore described it will be observed that the drivers are set outside of the crushing-chamber, where they are not subjected to wear by contact with the ore.

Having thus described my invention, I claim and desire to secure by Letters Patent—

1. In a centrifugal crushing-mill, the combination of a crushing-ring, a crushing-roller, a shaft on which said roller is carried, arms set outside of said chamber for imparting motion to said roller, and springs against which said shaft cushions, said roller revolving about the axis of said crushing-ring and being by centrifugal action forced against the interior of said crushing-ring, and said springs constantly tending to throw said roller away from said ring, substantially as described.

2. In a crushing-mill, the combination of a revolving shaft carrying a crushing-roller, a crushing-chamber, a revolving side plate provided with perforations through which said shaft passes, and a disk attached to said revolving shaft between said side plate and said crushing-roller, substantially as and for the purpose specified.

3. In a crushing-mill, an inclosing-chamber provided with an inner circumferential groove, combined with a revolving side plate forming part of said inclosing-chamber, and a fan carried on said side plate and traveling in said groove, substantially as described.

4. In a crushing-mill, the combination of an inclosing-chamber provided with an inner circumferential groove, a crushing-ring, a crushing-roller, a shaft revolving about the center of said ring and carrying said roller, a revolving side plate, N', forming part of said inclosing-chamber, and a fan carried on said side plate and traveling in said groove, substantially as described.

5. In a crushing-mill, the combination, with a crushing-ring and crushing-roller, of a plurality of flat sieves revolving in parallel planes, with an intervening space between them, said space being open at its periphery, substantially as described.

6. In a crushing-mill, a crushing ring and roller and a plurality of revolving sieves of different mesh set one in front of the other, with an intervening space between them, said space being open at its periphery, combined with a revolving fan, arranged substantially as described, to travel about the periphery of said intervening space.

7. In a crushing-mill, a revolving shaft carrying a crushing-roller, and a side plate through which said shaft passes, combined with a disk attached to said shaft a distance inside of said side plate to prevent by centrifugal action of said disk leakage through said side plate, substantially as described.

GIDEON FRISBEE.

Witnesses:
SCHUYLER C. STROCK,
J. H. BLOOD.